United States Patent
James et al.

(10) Patent No.: US 11,277,027 B2
(45) Date of Patent: Mar. 15, 2022

(54) VAR CONTROL FOR INDUCTIVE POWER TRANSFER SYSTEMS

(71) Applicants: Auckland UniServices Limited, Auckland City (NZ); Jason Edward Ian James, Titirangi (NZ)

(72) Inventors: Jason Edward Ian James, Titirangi (NZ); Grant Anthony Covic, Sandringham (NZ); John Talbot Boys, Albany (NZ)

(73) Assignee: Auckland Uniservices Limited, Auckland (NZ)

( * ) Notice: Subject to any disclaimer, the term of this patent is extended or adjusted under 35 U.S.C. 154(b) by 524 days.

(21) Appl. No.: 14/376,401

(22) PCT Filed: Feb. 1, 2013

(86) PCT No.: PCT/NZ2013/000009
§ 371 (c)(1),
(2) Date: Aug. 1, 2014

(87) PCT Pub. No.: WO2014/007656
PCT Pub. Date: Jan. 9, 2014

(65) Prior Publication Data
US 2015/0035377 A1 Feb. 5, 2015

(30) Foreign Application Priority Data
Feb. 2, 2012 (NZ) .......................................... 597987

(51) Int. Cl.
*H02J 50/12* (2016.01)
*H02J 7/02* (2016.01)
(Continued)

(52) U.S. Cl.
CPC .............. *H02J 50/12* (2016.02); *H01F 38/14* (2013.01); *H02J 3/1864* (2013.01); *H02J 5/005* (2013.01);
(Continued)

(58) Field of Classification Search
CPC .............. H02J 50/00; H02J 50/12; H04B 5/00
(Continued)

(56) References Cited

U.S. PATENT DOCUMENTS 4,417,194 A * 11/1983 Curtiss .................. H02J 3/1835
290/40 B
5,293,308 A * 3/1994 Boys ....................... H02J 5/005
324/392

(Continued)

FOREIGN PATENT DOCUMENTS

CN 1813384 A 8/2006
CN 101645619 A 2/2010
(Continued)

OTHER PUBLICATIONS

Dartmouth University, A Resonant Circuit, Aug. 13, 2003, Physics 14 Lab Manual, pp. 1-11. Available at http://www.dartmouth.edu/~physics/labs/descriptions/lrc.circuits/lrc.writeup.pdf (Year: 2003).*
(Continued)

*Primary Examiner* — Adi Amrany
(74) *Attorney, Agent, or Firm* — Edell, Shapiro & Finnan, LLC

(57) ABSTRACT

Disclosed herein is an inductive power transfer (IPT) compensation circuit and method for reflecting a controlled reactance to a primary conductor at a selected operating frequency, compensating for reactive loads reflected to the primary conductor by one or more other pick-ups inductively coupled with the primary conductor in use. The compensation circuit comprises a first switch means coupled
(Continued)

to a resonant circuit and operable to reflect a capacitive reactance to the primary conductor; a second switch means coupled to the resonant circuit and operable to reflect an inductive reactance to the primary conductor; and control means adapted to control operation of the first and second switch means to compensate for inductive and capacitive reactances, respectively, in the primary conductor.

20 Claims, 8 Drawing Sheets

(51) Int. Cl.
| | |
|---|---|
| *H02M 3/335* | (2006.01) |
| *H02J 3/18* | (2006.01) |
| *H01F 38/14* | (2006.01) |
| *H02J 5/00* | (2016.01) |
| *H02M 1/42* | (2007.01) |
| *H02M 7/48* | (2007.01) |

(52) U.S. Cl.
CPC ......... *H02J 7/025* (2013.01); *H02M 3/33576* (2013.01); *H02M 1/42* (2013.01); *H02M 7/4818* (2021.05); *Y02B 70/10* (2013.01)

(58) Field of Classification Search
USPC ........................................................ 307/104
See application file for complete search history.

(56) References Cited

U.S. PATENT DOCUMENTS

| | | | | |
|---|---|---|---|---|
| 6,188,179 | B1* | 2/2001 | Boys .................. | H05B 41/24 315/242 |
| 6,515,878 | B1 | 2/2003 | Meins et al. | |
| 6,705,441 | B1* | 3/2004 | Boys .................. | H02J 5/005 191/10 |
| 8,093,758 | B2 | 1/2012 | Hussmann et al. | |
| 8,941,266 | B2* | 1/2015 | Boys .................. | H02J 5/005 307/104 |
| 2002/0180408 | A1* | 12/2002 | McDaniel ............ | H02J 3/1828 323/211 |
| 2003/0201731 | A1* | 10/2003 | Baarman .............. | A61L 2/10 315/276 |
| 2005/0083627 | A1* | 4/2005 | Wang .................. | B60L 9/005 361/113 |
| 2006/0082348 | A1* | 4/2006 | Kehrli ................. | H02J 3/1828 323/207 |
| 2007/0059986 | A1* | 3/2007 | Rockwell ............ | G01R 19/2513 439/638 |
| 2007/0109708 | A1* | 5/2007 | Hussman ............. | H02J 1/00 361/113 |
| 2008/0106241 | A1* | 5/2008 | Deaver ................ | H02J 3/1828 323/209 |
| 2009/0243397 | A1 | 10/2009 | Cook et al. | |
| 2009/0302688 | A1 | 12/2009 | Boys | |
| 2010/0002475 | A1* | 1/2010 | Folts .................. | H02J 9/062 363/37 |
| 2010/0097830 | A1* | 4/2010 | Wang .................. | H02J 5/005 363/126 |
| 2011/0169461 | A1* | 7/2011 | Deaver, Sr. .......... | G05F 1/70 323/209 |
| 2012/0104850 | A1* | 5/2012 | Fallis .................. | H02J 3/1828 307/31 |
| 2012/0169134 | A1* | 7/2012 | Choudhary .......... | H04B 5/0081 307/104 |
| 2012/0200158 | A1 | 8/2012 | Takei | |
| 2012/0313444 | A1* | 12/2012 | Boys .................. | H02J 50/12 307/104 |
| 2013/0204554 | A1* | 8/2013 | Tuckey ................ | G01R 19/2513 702/58 |
| 2016/0134155 | A1 | 5/2016 | Bennett | |

FOREIGN PATENT DOCUMENTS

| | | |
|---|---|---|
| EP | 2151907 A2 | 2/2010 |
| JP | 2000-184625 A | 6/2000 |
| JP | 2009-201211 A | 9/2009 |
| JP | 2011-205761 A | 10/2011 |
| WO | WO-2010/030195 | 3/2010 |
| WO | WO-2011/046453 | 4/2011 |
| WO | WO-2011042974 A1 | 4/2011 |
| WO | 2011/145953 A1 | 11/2011 |
| WO | WO-2012/030238 | 3/2012 |
| WO | WO-2014/007656 | 1/2014 |

OTHER PUBLICATIONS

"Chinese Application Serial No. 201380017845.5, Office Action dated May 23, 2016", (w/ English Translation), 26 pgs.

"European Application Serial No. 13813549.6, extended European Search Report dated Apr. 5, 2016", 11 pgs.

"European Application Serial No. 13813549.6, Supplementary Partial European Search Report dated Nov. 23, 2015", 6 pgs.

"Interntional Application No. PCT/NZ2013/000009, International Preliminary Report on Patentability dated Aug. 14, 2014", 8 pgs.

"International Application No. PCT/NZ2013/000009, Filing of Amendments of the Claims under Article 19 dated Nov. 18, 2013", (Nov. 18, 2013), 10 pgs.

"International Application No. PCT/NZ2013/000009, International Search Report and Written Opinion dated Sep. 18, 2013", (Sep. 18, 2013), 13 pgs.

Kissin, M. L.G., et al., "Detection of the Tuned Point of a Detection of the Tuned Point of a Fixed-Frequency LCL Resonant Power Supply", IEEE Trans. Power Electronics Society, vol. 24 Issue:4, pp. 1140-1143, (Apr. 2009), 1140-1143.

English Translation of Notification of Reasons of Rejection in counterpart Japanese Application No. 2014-555521, dated Mar. 6, 2018, 10 pages.

\* cited by examiner (a)          (b)

VAR CONTROL FOR INDUCTIVE POWER TRANSFER SYSTEMS

PRIORITY CLAIM TO RELATED APPLICATIONS

This application is a U.S. national stage application filed under 35 U.S.C. § 371 from International Application Serial No. PCT/NZ2013/000009, which was filed Feb. 1, 2013, and published as WO 2014/007656 on Jan. 9, 2014, and which claims priority to New Zealand Application No. 597987, filed Feb. 2, 2012, which applications and publication are incorporated by reference as if reproduced herein and made a part hereof in their entirety, and the benefit of priority of each of which is claimed herein.

FIELD OF THE INVENTION

This invention relates to inductive power transfer (IPT) systems. More particularly, the invention relates to the control of reactive power in IPT systems to compensate for unwanted reactive power (or VARs) reflected onto a conductive track of the system.

BACKGROUND

Inductive power transfer (IPT) systems are widely used in industry and elsewhere to wirelessly transfer power between an AC power source and an IPT pick-up inductively coupled, in use, with a primary conductive path or track supplied by the AC power source. IPT pick-up circuits process alternating current (AC) to provide power to a load.

Examples of such systems are disclosed by International Patent Publication No. WO 2010/030195 and No. WO 2011/046453, the contents of both of which are incorporated herein by reference.

International Patent Publication No. WO 2010/030195, for example, discloses a parallel-tuned IPT pick-up comprising a parallel pick-up coil and tuning capacitor together forming a resonant circuit, and a controller to vary a phase angle between the pick-up coil induced voltage and the tuning capacitor voltage to thereby provide a controlled AC supply to an output of the pick-up.

International Patent Publication No. WO 2011/046453 discloses a series-tuned IPT pick-up comprising a pick-up coil and a tuning capacitor in series, together with a controller adapted to control the pick-up coil inductor current and thereby vary a phase angle between the pick-up coil open circuit voltage and the pick-up coil inductor current.

A person skilled in the art will appreciate that variation of the phase angles by the pick-ups disclosed by WO 2010/030195 and WO 2011/046453 results in a capacitive load being reflected on the track.

Other pick-up controllers, such as the circuits described in International Patent Publication No. WO 2012/030238, may cause an inductive load to be reflected to the track.

The above pick-up circuit topologies and their reflected loads are shown in FIGS. 1-4. These circuits are normally used to provide controlled AC resonance to either an AC or DC load depending on desired operation. In such circuits the object is to provide controlled real power to the load, with the consequential volt-ampere reactive (VAR) load reflected back to the track during operation considered an undesirable but necessary aspect of this control technique. The reflected reactive loads cannot be easily avoided given they are not constant (varying with the control action on the output load) and therefore cannot be simply removed using passive compensation.

As shown by FIGS. 1(b), 2(b), 3(c) and 4(c), the magnitude of the VARs can be as significant as the power drawn. Therefore, in highly coupled loads or in applications where there are many weakly-coupled loads (such as in a lighting rig) which operate using controllers of the prior art, the addition of all of these VARs can be significant and may not be able to be discounted in the system design.

In any IPT system, unwanted VARs must be controlled or taken into account during system design. In fixed frequency systems which use an LCL network topology at the output of the resonant power supply, each of the reactive components are carefully selected and tuned to resonance at the designed operational frequency of the supply. As such, any capacitive or inductive reactance reflected onto the track will undesirably mistune the frequency of the alternating current in the track. Added inductance will appear as a capacitive load on the bridge of the power supply inverter, while any capacitive load will appear inductive. As described in Kissin M., Huang C, Covic G. A. and Boys J. T "Detection of the tuned point of a fixed frequency LCL resonant power supply" *IEEE Trans. Power Electronics Society*, 24, no. 4, pp. 1140-1143, April 2009, most controllers are sensitive to such mistuning and can handle around 10% variation in this track tuning at best without over-specifying the design of the supply, but normal loads are assumed to have constant reflected VARs enabling the system to be configured to ensure the bridge only sees inductive loading. For lighting systems employing the controllers of the prior art, or for electric vehicle (EV) applications where mistuning results from highly coupled dynamic loads which are not ideally aligned, for example, passive compensation may not be enough and active compensation may be required.

Thus in applications where the expected VAR changes happen slowly or are present for a significantly long time, for example due to degradation of capacitors (e.g. due to aging and temperature), undesirable alignment of transmitter and receiver pads (e.g. in EV wireless charging applications), or use of a series-tuned pick-up rather than a parallel-tuned pickup for supplying a load, then slow compensation schemes such as the use of switched capacitors can be employed as a compensation means. However, in other applications such as in lighting control or power control to moving vehicles, the VAR changes may be equally significant but rapidly changing so that slow compensation means are unable to react in the time required and premature shutdown of the power supply could result.

OBJECT OF THE INVENTION

It is therefore an object of the invention to provide an apparatus and/or method producing a controlled VAR reflected back onto the primary conductor to compensate for unwanted VARs which may be rapidly changing during operation, or alternatively to at least provide the public with a useful alternative to known apparatus or methods.

Further objects of the invention will become apparent from the following description.

SUMMARY OF INVENTION

In a first aspect, the present invention may broadly be said to consist in a method of VAR compensation in an inductive power transfer (IPT) system using a compensation device inductively coupled to a primary conductive path of the IPT system, wherein the method comprises controlling the compensation device to compensate a reactance seen by a primary power supply which energises the primary conductive path while drawing minimal power from the primary power supply.

Preferably the method includes the step of determining a range of reflected reactance for a range of power drawn from the primary supply.

Preferably the method further comprises retuning the primary conductive path to bring the compensation device within the range of reflected impedance.

Preferably the step of retuning the primary conductive path comprises coupling or decoupling a capacitor in series with the primary conductor, or incrementing the frequency of the primary supply.

Preferably the method further comprises sensing the reactance seen by the primary power supply and controlling the compensation device dependent on the sensed reactance.

Preferably the method further comprises the step of detecting when the sensed reactance reaches a first threshold before changing the magnitude of the magnitude of the reactance provided by the compensation device.

In a second aspect, the invention may broadly be said to consist in a method for controlling reactance in the primary conductor of an inductive power transfer (IPT) system, the method comprising:
    sensing a variable reactance in the primary conductor; and
    controlling a first reactive element associated with a resonant circuit inductively coupled with the primary conductor, dependent on the sensed reactance, to reflect a controlled compensatory reactance ameliorating the reactance in the primary conductor.

Preferably the method further comprises the step of selectively activating a passive compensation means prior to operation of the IPT system, to ameliorate a substantially constant component of reactance in the primary conductor, whereby the controlled compensatory reactance is minimized.

Preferably the step of selectively activating the passive compensation means comprises providing a capacitor in series with the primary conductor, or incrementing the frequency of a power supply supplying the primary conductor.

Preferably the first reactive element is operable to reflect a capacitive reactance to ameliorate an inductive reactance in the primary conductor.

Alternatively, the first reactive element may be operable to reflect an inductive reactance to ameliorate a capacitive reactance in the primary conductor.

Preferably the first reactive element comprises a capacitor selected to resonate with a series inductor at an operating frequency of the IPT system and thereby short an inductive pick-up of the resonant circuit inductively coupled with the primary conductor.

Alternatively, the first reactive element may comprise a capacitor selected to be controllable to have an effective capacitance resonant with a series inductor through a range of frequencies about an operating frequency of the IPT system. More specifically, the capacitor may be selected to be controllable to have an effective capacitance ranging from zero to at least twice a capacitance resonant with the series inductor at the operating frequency.

Preferably, the method of the second aspect further comprises the step of controlling a second reactive element associated with the resonant circuit, dependent on the sensed reactance, wherein the first reactive element is operable to reflect a capacitive reactance to ameliorate an inductive reactance in the primary conductor, and the second reactive element is operable to reflect an inductive reactance to ameliorate a capacitive reactance in the primary conductor.

Preferably the step of biasing the primary conductor towards a capacitive reactance, whereby the second reactive element is predominantly or exclusively operated in preference to the first reactive element, to minimise harmonics.

In a third aspect, the invention may broadly be said to consist in an inductive power transfer (IPT) compensation circuit for reflecting a controlled reactance to a primary conductor at a selected operating frequency, the circuit comprising:
    a resonant circuit comprising a pick-up coil and a tuning capacitor, for inductive coupling with the primary conductor in use;
    a controllable reactive element coupled to the resonant circuit and operable to reflect a compensatory reactance to the primary conductor; and
    control means operable to control the controllable reactive element to compensate for the sensed reactance and thereby ameliorate reactance in the primary conductor.

Preferably the compensation circuit further comprises sensing means for sensing the reactance in the primary conductor.

Preferably the controllable reactive element comprises a controllable capacitor in series with an inductor, and the controllable capacitor and series inductor are selected such that the controllable capacitor may be controlled to selectively reflect both an inductive and a capacitive reactance.

Alternatively, the controllable reactive element is operable to reflect one of a substantially inductive or capacitive reactance, and the compensation circuit further comprises a second controllable reactive element operable to reflect the other of a substantially inductive or capacitive reactance.

In a fourth aspect, the invention may broadly be said to consist in an inductive power transfer (IPT) compensation circuit for reflecting a controlled reactance to a primary conductor at a selected operating frequency, the circuit comprising:
    a resonant circuit comprising a pick-up coil and a tuning capacitor, for inductive coupling with the primary conductor in use;
    a first switch means coupled to the resonant circuit and operable to reflect a capacitive reactance to the primary conductor;
    a second switch means coupled to the resonant circuit and operable to reflect an inductive reactance to the primary conductor; and
    control means adapted to control operation of the first and second switch means to compensate for inductive and capacitive reactances, respectively, in the primary conductor.

Preferably the control means comprises sensing means for sensing a reactance in the primary conductor.

Preferably the first switch means is configured to selectively vary a phase angle between the pick-up coil open-circuit voltage and the pick-up coil current.

Preferably the first switch means is configured to vary the phase angle by maintaining a substantially constant tuning capacitor voltage for a selected time period.

Preferably the first switch means is configured to clamp the tuning capacitor voltage at substantially zero volts for the selected time period.

Preferably the IPT compensation circuit further comprises a second resonant circuit comprising a plurality of additional reactive elements tuned to resonate at or near the selected operating frequency, and the second switch means is configured to selectively decouple one of said plurality of additional reactive elements.

Preferably the first and second switch means each comprise an AC switch.

Preferably the pick-up coil and tuning capacitor are provided in parallel.

Preferably the first switch means is provided in parallel with the resonant circuit.

Preferably the additional reactive elements of the second resonant circuit comprise a series inductor and capacitor, together provided in parallel with the pick-up coil and tuning capacitor, and the second switch means is operable to selectively decouple the additional capacitor.

Preferably the tuning capacitor is selected to resonate with the combined impedance of the pick-up coil and additional inductor at the selected operating frequency.

Preferably the pick-up coil and tuning capacitor are provided in series.

Preferably the first switch means is provided in series with the resonant circuit.

Preferably the additional reactive elements of the second resonant circuit comprise a parallel inductor and capacitor, together provided in series with the pick-up coil and tuning capacitor, and the second switch means is operable to selectively decouple the additional inductor.

Preferably the tuning capacitor is selected to resonate with the pick-up coil and the additional capacitor at the selected operating frequency.

In a fifth aspect, the present invention may broadly bee said to consist in an inductive power transfer (IPT) system comprising a power supply electrically coupled to a primary conductor, and a compensation circuit according to the third or fourth aspects of the invention inductively coupled, in use, with the primary conductor.

Preferably the power supply and/or primary conductor is operable to retune the primary conductive path to substantially ameliorate a constant or slow-varying reactance.

Preferably an output of the compensation circuit is electrically coupled to a DC bus of the power supply.

In a sixth aspect, the invention may broadly be said to consist in a method for controlling an inductive power transfer (IPT) compensation circuit comprising a pick-up coil and a tuning capacitor forming a first resonant circuit, the method comprising the steps of:
  sensing a capacitive or inductive reactance in a primary conductor with which the compensation circuit is, in use, inductively coupled;
  selectively operating a first switch means of the compensation circuit to reflect a capacitive reactance to the primary conductor to compensate for a sensed inductive reactance; and
  selectively operating a second switch means of the compensation circuit to reflect an inductive reactance to the primary conductor to compensate for a sensed capacitive reactance.

Preferably the step of selectively operating the first switch means comprises varying a phase angle between a pick-up coil open-circuit voltage and a pick-up coil current of the compensation circuit.

Preferably the step of selectively operating the first switch means comprises clamping a current in a resonant circuit of the IPT compensation circuit.

Preferably the step of selectively operating the second switch means comprises selectively decoupling one of a plurality of additional reactive elements forming a second resonant circuit.

In a seventh aspect, the invention may broadly be said to consist in an inductive power transfer (IPT) compensation circuit for coupling with the primary conductive path of an IPT system, the circuit comprising means to receive an indication of the reactive load seen by a primary power supply of the IPT system, and control means to control the compensation device to compensate the reactance while drawing minimal power from the primary power supply.

In an eighth aspect, the invention may broadly be said to consist in a primary inductive power transfer (IPT) resonator operable to transfer power to a secondary IPT resonator to form an IPT system having a nominal tuning state and a tolerance within the tuning state, wherein the tuning of the primary resonator circuit is adjustable such that a tuning range of the secondary IPT resonator is capable of adjusting the tuning state of the IPT system to the nominal tuning state of the system or within the tolerance of the nominal state.

Preferably the primary circuit comprises one or more controllable reactive components and/or one or more components operable to increment a frequency of the system so as to adjust the tuning of the primary resonator.

In a ninth aspect, the invention may broadly be said to consist in an inductive power transfer (IPT) power supply for coupling to a primary conductor to supply power inductively to a compensation circuit and one or more other pick-up circuits, the power supply comprising a DC bus to receive power from an output of the compensation circuit.

In a tenth aspect, the invention may broadly be said to consist in an inductive power transfer system (IPT) power supply for coupling to a primary conductor to supply power inductively to a compensation circuit and one or more other pick-up circuits, the power supply comprising sensing means to sense a reactive load and communicate the sensed reactive load to the compensation circuit.

Further aspects of the invention, which should be considered in all its novel aspects, will become apparent from the following description.

DRAWING DESCRIPTION

A number of embodiments of the invention will now be described by way of example with reference to the drawings in which.

Figure 4A:
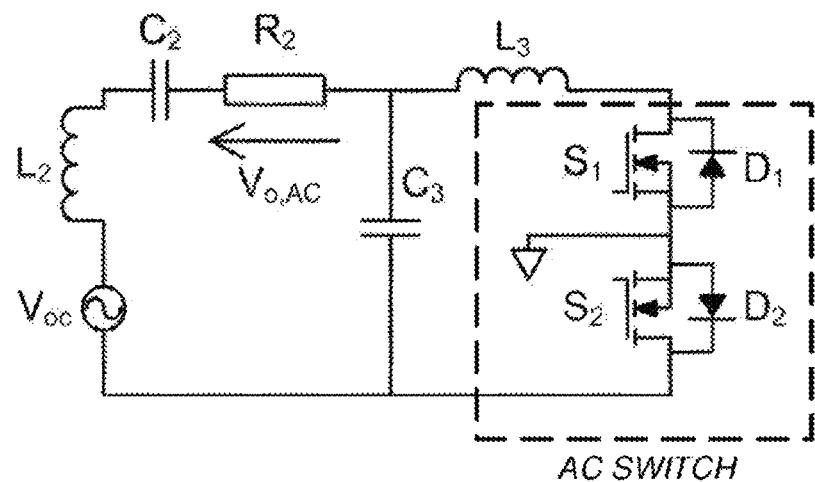
FIG. 4 (a) is a circuit diagram of a series-tuned IPT pick-up circuit with an additional resonant tank; (b) is a circuit diagram of an equivalent fundamental model of the circuit of FIG. 4(a); (c) is a chart of the normalised reflected load of the circuit of FIG. 4(a); and (d) is diagram of a circuit used for evaluation of the reflected VARs of the circuit of FIG. 4(a)
Figure 5:
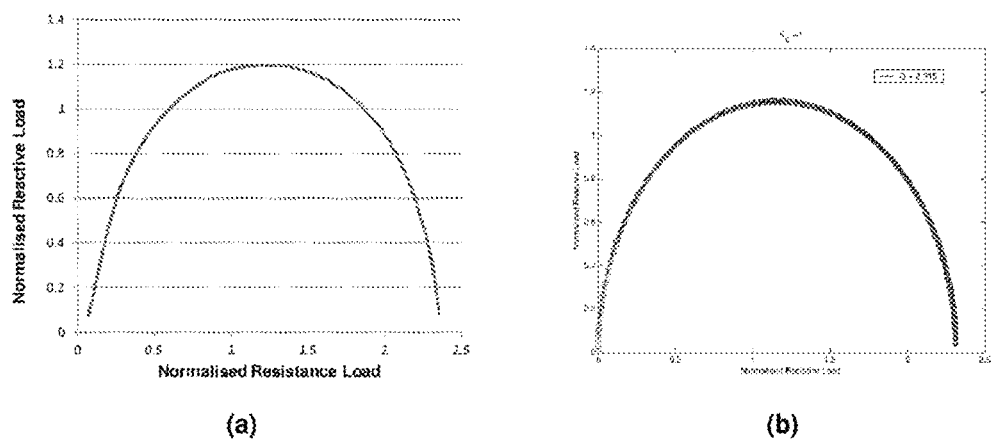
Figure 6:
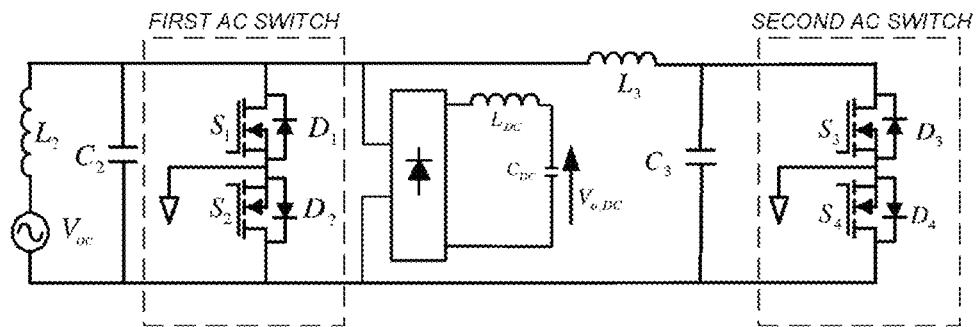
Figure 7:
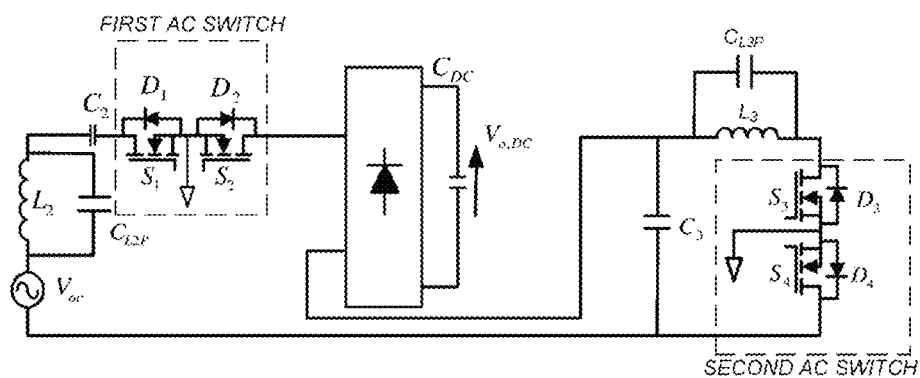
Figure 8:
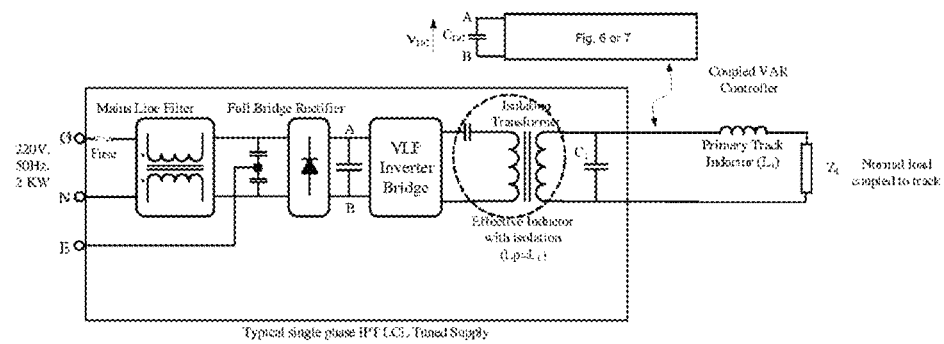
Figure 9:
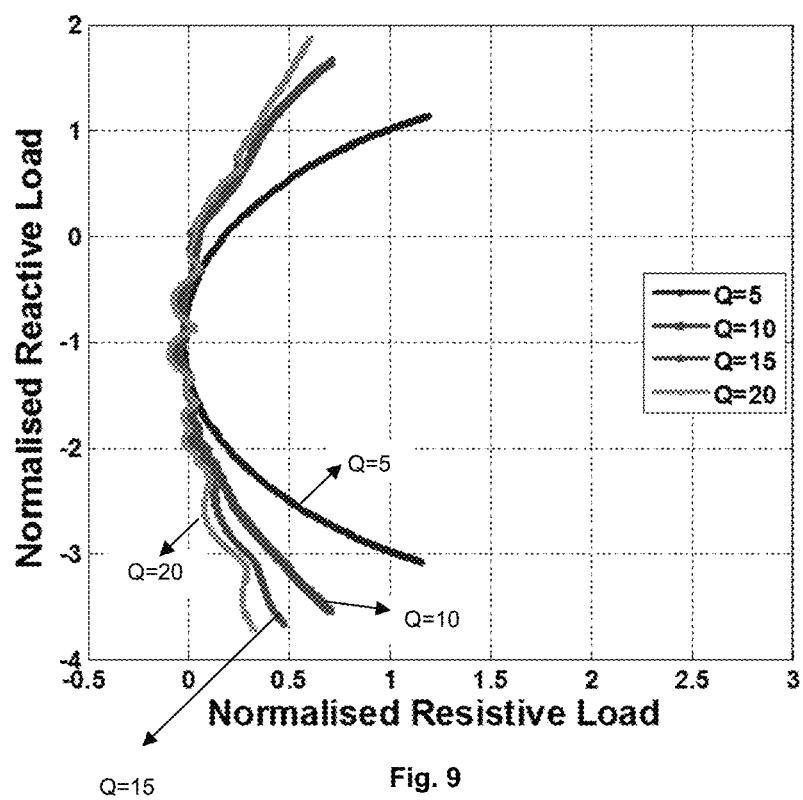

FIG. 5 provides a comparison of (a) measured and (b) simulated values of the normalised reflected load for the circuit of FIG. 4(a), for Q=2.3 and $K_C$=1;

FIG. 6 is a circuit diagram of a parallel-tuned IPT compensation circuit according to the present invention;

FIG. 7 is a circuit diagram of a series-tuned IPT compensation circuit according to the present invention;

FIG. 8 is a diagram of an IPT system incorporating an IPT compensation circuit according to the present invention; and FIG. 9 is a chart of the normalised reactive and resistive loads of a further embodiment of a compensation circuit of the present invention.

DETAILED DESCRIPTION OF THE DRAWINGS

Throughout the description like reference numerals will be used to refer to like features in different embodiments.

In many IPT systems the air-gap (between the primary conductor and inductive coil of the pick-up circuit) is stable and the tuning of the system is essentially constant so that the VAR load can be expected to be fairly constant. But in other IPT systems, such as a roadway system (supplying power inductively to moving and/or stationary vehicles) this is not the case. The real load can vary causing a slight change in VARs unless the system is perfectly tuned, but the air-gap can vary over a wide range and such variation will cause large changes in the VAR requirements. In addition, the respective "charging pads" (power transmitter and receiver, or primary conductor and pick-up coil) are invariably not perfectly aligned, giving a change in VARs that needs to be compensated. The pad on the ground and the pad on the vehicle may not have been made by the same manufacturer and may be tuned differently—series versus parallel or vice versa—so that there may also be an offset VAR load that cannot be predicted. The system may also have some foreign metal on the ground pad that must cause errors but it is impossible to predict how large the errors might be. In all these circumstances the VAR load cannot be pre-set to the correct value and there is accordingly a need for a VAR load controller that will tune the system correctly regardless of the state that it is in. If all the errors are added it is likely that the required VAR correction may be of the order of 10-15% corresponding to the system being off-frequency by up to 7.5%.

According to the present invention, the primary power supply bridge currents are preferably monitored to determine how close the primary power supply inverter switches are operating to their design limits. This feedback is used to activate compensation means inductively coupled with the output of the primary power supply, preferably in series with the main track inductance. Such compensation means will preferably include a combination of both slow and fast switched compensation elements. Slow switched or passive compensation (which generally cannot be easily switched in or out of the primary circuit during operation) such as switched capacitors (not shown in the drawings) or making a small change to the frequency of the power supply prior to operation can be used to compensate a substantially constant known or slow-varying mistuning or large mistuned systems, but in combination there is also provided an active fast-varying compensation circuit (normally of a smaller magnitude) according to the present invention to provide some means of further compensation as and when required. The passive or slow-switched compensation thus provides 'coarse' compensation as required to ameliorate a majority of any reactance in the primary conductor, while the fast-acting compensation provides 'fine' control and acts to ameliorate variable reactance as it arises. Thus in one embodiment the invention involves tuning or preparing the primary arrangement so that a required nominal reactance is typically seen by the primary power supply during operation of the system. The nominal reactance is selected so that one or more compensation circuits (as will be described further herein) which are coupled to the primary can be used to provide an effective range of reflected reactance to the primary to compensate unwanted VARs that may otherwise be seen by the primary power supply. Ideally the primary is tuned so that the supply sees no reactive load. However in practice it is typically desirable that the inverter bridge of the primary power supply sees a slightly inductive load rather than a capacitive load for efficient operation. Therefore, in tuning the primary conductor arrangement, a user may add components or otherwise design the primary side of the system such that during operation the primary power supply is very unlikely to see a capacitive load. A disadvantage with this approach is that in some applications where there is uncertainty in the variation of the reactive loading on the system further coarse adjustment may be necessary. Means for providing this adjustment is discussed further below. Such adjustment may be performed by a control system, or manually. In one embodiment, if such adjustment is detected as being desirable, then the system powers down to facilitate the switching in (or out) of capacitance for example.

In one example the present invention allows fine adjustment of the reactance seen by the primary supply by providing coupled compensation devices that are controllably operable to tune out changes in reactance from loads being supplied by the system or other factors.

Furthermore, the reactance of the primary pad or track can be biased dependent on the nature of the coupled compensation circuit(s) to be used and vice versa. In one example the primary can be set up with additional bias and the primary the compensation circuits can operate to compensate for the additional bias inductance when it is not required. For example, a compensation device may be used to provide a controllable reflected compensatory capacitance to compensate for an inductive bias of the primary pad or track arrangement. Under nominal load conditions the compensation device supplies a reflected capacitance with a nominal "offset" which is in the middle of a selected control range. When an additional capacitive load is experienced the compensation device reduces the magnitude of the reflected capacitance below that offset accordingly. Similarly, if an additional inductive load is experienced by the primary then the compensation device increases the magnitude of the reflected capacitance to compensate.

Similarly, if the system is such that a capacitive bias is initially present on the primary pad or track, then a compensation device that is designed to provide a controllable range of reflected inductance to the primary pad or track can be used.

Furthermore, as will be seen from the disclosure of this document, a compensation device may be provided which nominally supplies little or no reflected reactance to the primary i.e. the device may not have an offset as it can selectively reflect both capacitive and inductive reactance to the primary side of the system, dependent on what is required for effective compensation.

In one embodiment of the invention the control apparatus and method includes providing one or more thresholds that must be reached or exceeded before implementing a change on the reactance reflected back to the primary. In one example the reactance as seen by the primary power supply must reach or exceed a first threshold before the compensation device provides a change in reflected reactance from the offset or nominal value. Similarly, once the compensation device is operable to provide a reflected reactance beyond the offset value, a change in the reactance seen by the primary power supply may need to reach a second threshold before the control system changes the magnitude of the applied reflected reactance again. This embodiment can thus provide a degree of hysteresis to ensure that the system has desired stability, and can increase efficiency by preventing constant (and possibly unnecessary) changes in the reactance of the primary.

Various strategies may be used to perform the coarse tuning of the primary mentioned above, to ensure that coupled compensation devices according to the invention operate in an effective control range. In one example discrete components such as capacitors for example may be connected (for example in series) with the primary pad or track to arrive at the required nominal reactance seen by the primary power supply. In another example other system parameters may be changed, such as an incremental change to the frequency of the primary power supply. In this example the system is still operating under fixed frequency conditions. An incremental change (referred to for convenience in this document as an adjustment) can be made so that the nominal operating frequency is better suited to the required load and thus better places the coupled compensation device(s) in a position to be most effective for the power they draw from the primary. In one example, the incremental change in frequency may be 1% to 5% for example of the operating frequency, dependent on the system.

Figure 1A:
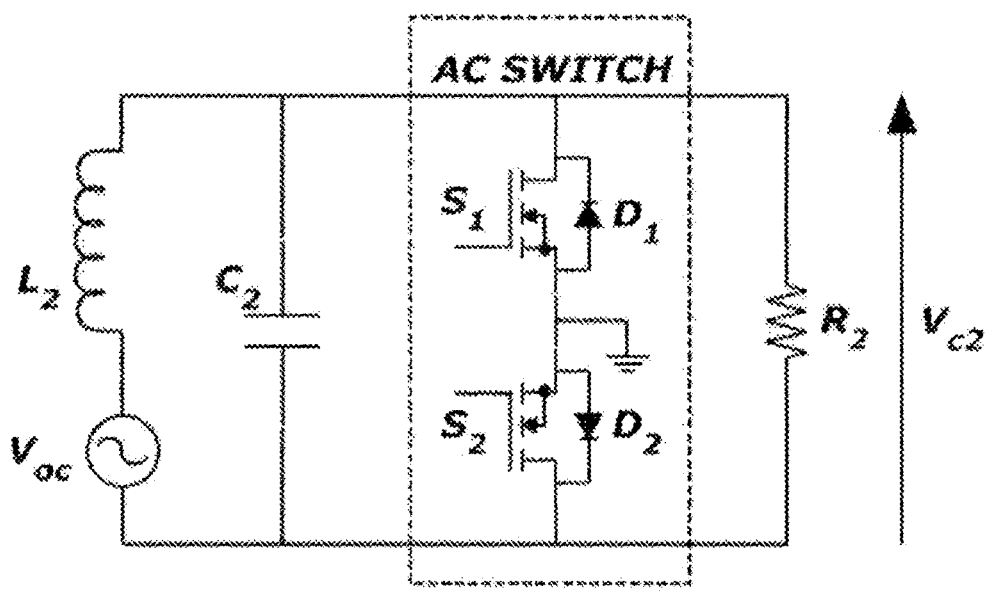
FIG. 1 (a) is a circuit diagram of a known parallel-tuned IPT pick-up circuit topology which may be utilised by the present invention; and (b) is a chart of the normalised reflected load of the circuit of FIG. 1(a)
Figure 1B:
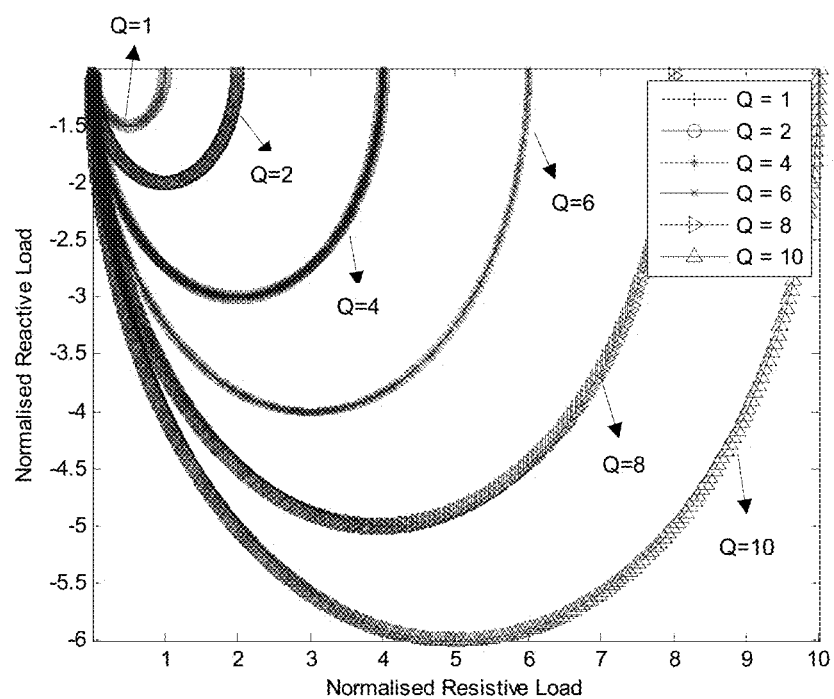
Figure 2A:
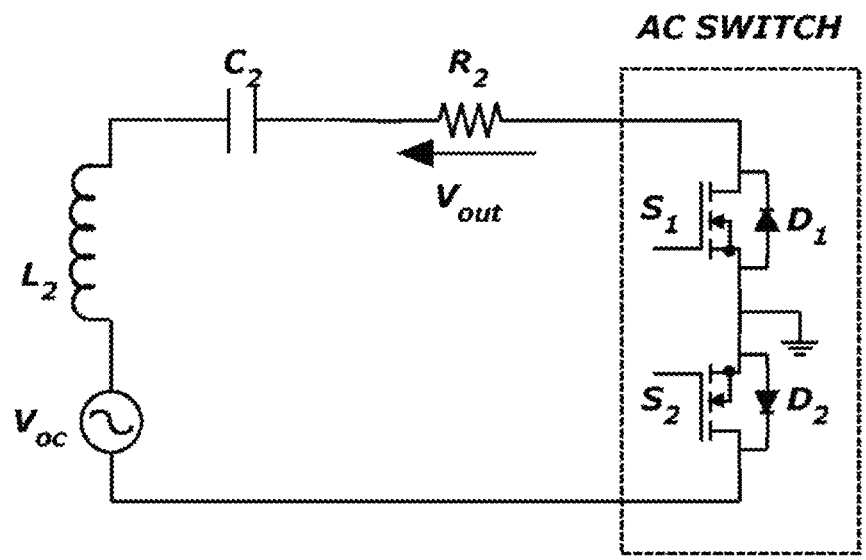
FIG. 2 (a) is a circuit diagram of a known series-tuned IPT pick-up circuit topology which may be utilised by the present invention; and (b) is a chart of the normalised reflected load of the circuit of FIG. 2(a)
Figure 2B:
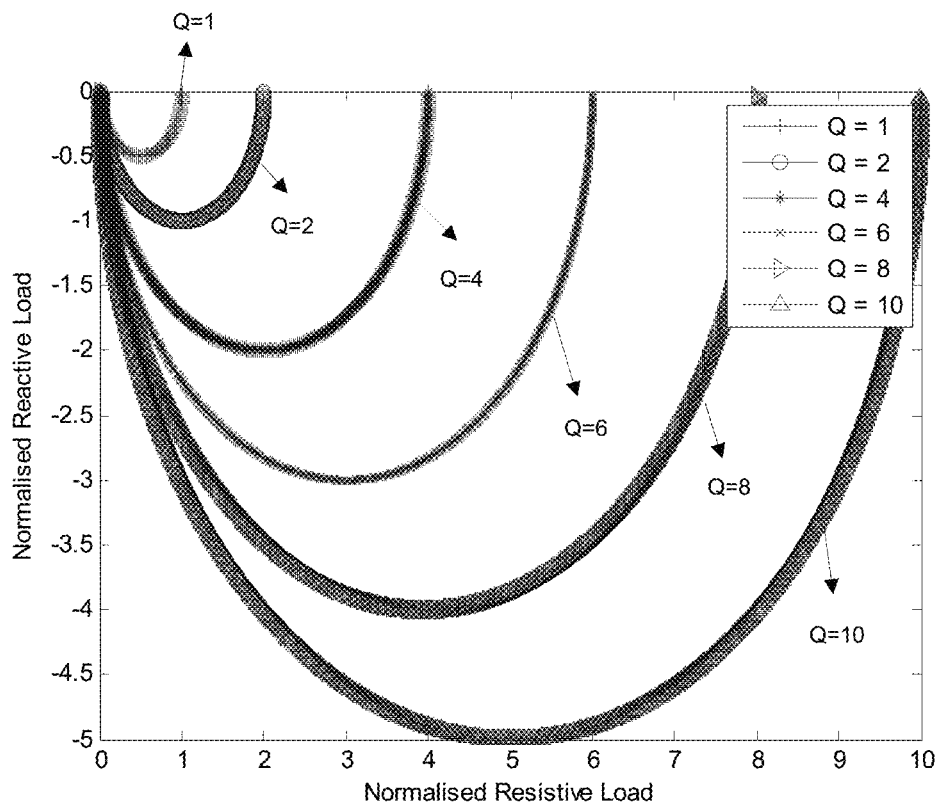

The normalized reflected impedance characteristic for the known parallel and series topologies of FIGS. 1(a) and 2(a) are shown in FIGS. 1(b) and 2(b), respectively, at different values of the load dependent quality factor, $Q_2$. Both the resistive and reactive components are normalized against the factor $Z_t$, where:

$$Z_t = \omega M^2 / L_2 \quad (1)$$

Here $L_2$ is the inductance of the secondary coil, M is the mutual inductance between the track and $L_2$, and $\omega$ is the frequency of operation of the IPT system. The factor $Z_t$ is the transfer impedance of the coupled circuit back onto the track and it is a direct measure of the magnetic coupling and power transfer capability. A phase delay $\phi$ of zero is plotted as points on the right hand side of the semicircle on FIG. 2(b) for each $Q_2$ value. As $\phi$ is increased, the impedance points move along the semicircle towards the left hand side. The real and imaginary power sourced by the primary power supply can be easily determined after the impedance values are denormalised and substituted into equations (2) and (3).

$$P = Re(Z_r) I_1^2 \quad (2)$$

$$VAR = Im(Z_r) I_1^2 \quad (3)$$

When $\phi$ is zero, only a resistive load is reflected back on the track and the real power is supplied by the power supply to drive the pick-up. As the phase angle $\phi$ increases to decrease the output power of the pick-up, both a real and a capacitive load is reflected on the primary track and the power supply has to source both the real power and the capacitive VARs. When $\phi$ increases towards 180°, both the reactive and resistive load decrease to zero. For the parallel topology shown in FIG. 1(b), the reflected impedance is very similar to the series topology with the only difference being that the initial impedance is offset at a normalised value of −1.

Figure 3A:
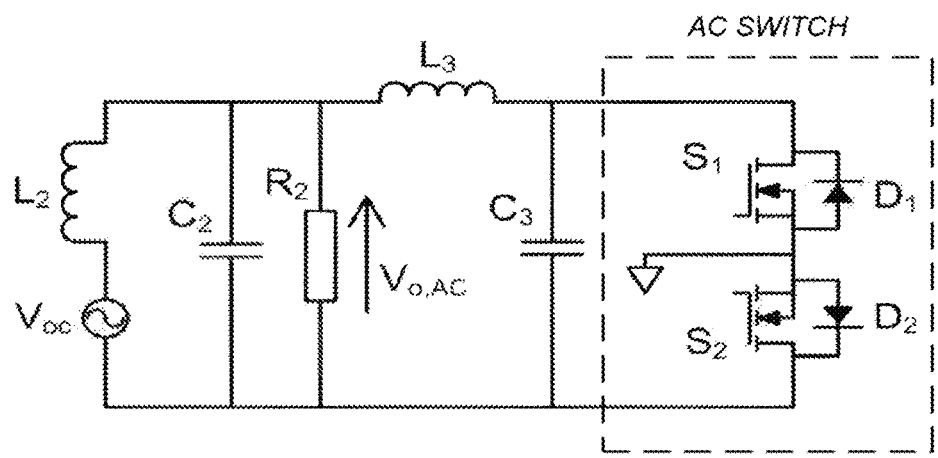
FIG. 3 (a) is a circuit diagram of a parallel-tuned IPT pick-up circuit with an additional resonant tank; (b) is a circuit diagram of an equivalent fundamental model of the circuit of FIG. 3(a); and (c) is a chart of the normalised reflected load of the circuit of FIG. 3(a) based on $K_L$ selection using the fundamental model of FIG. 3(b)
Figure 3B:
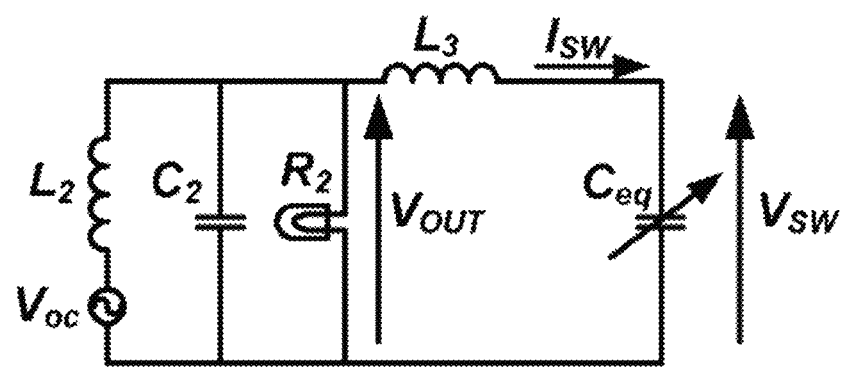
Figure 3C:
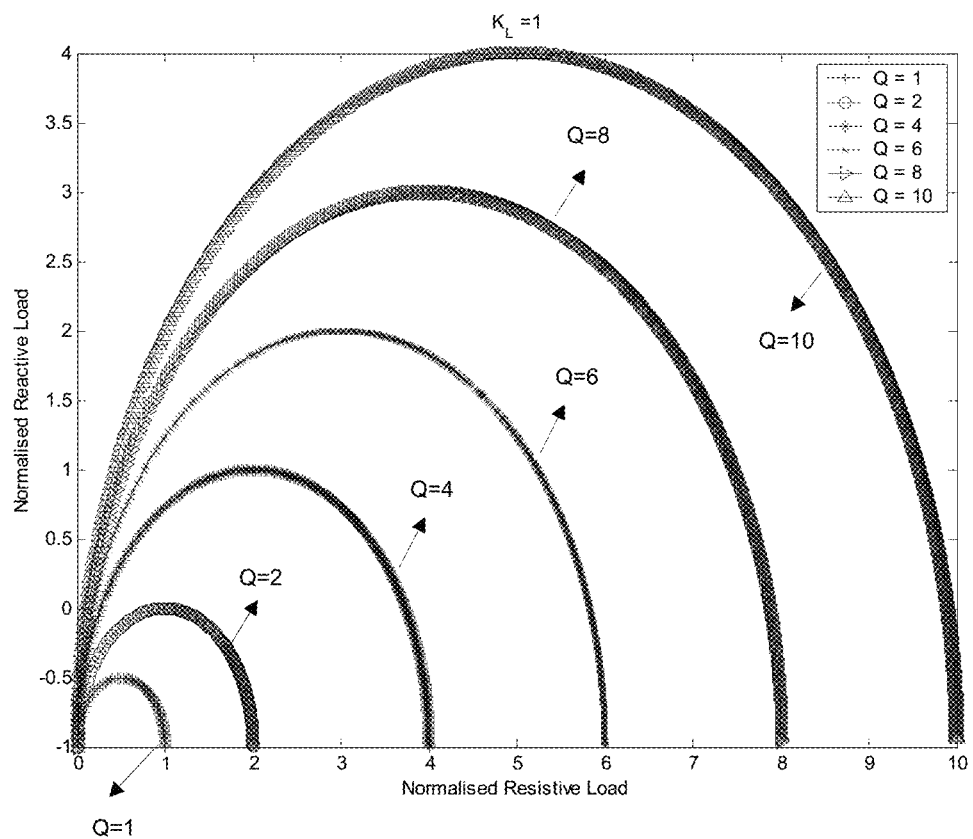
Figure 4B:
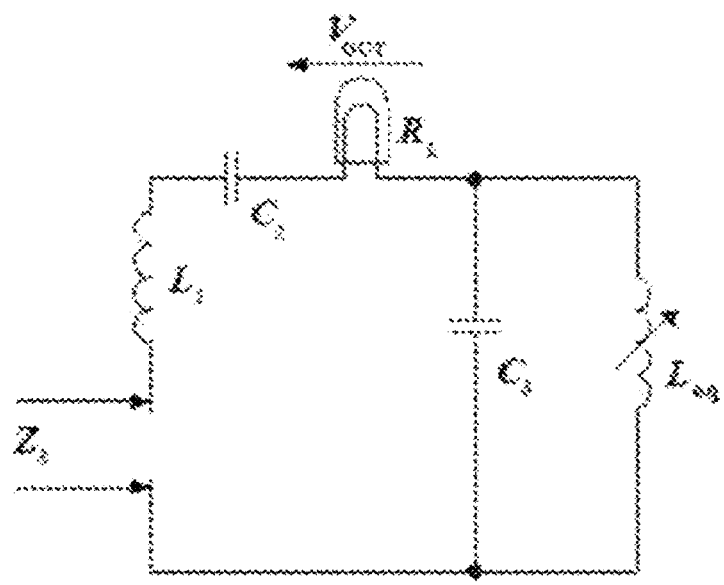
Figure 4C:
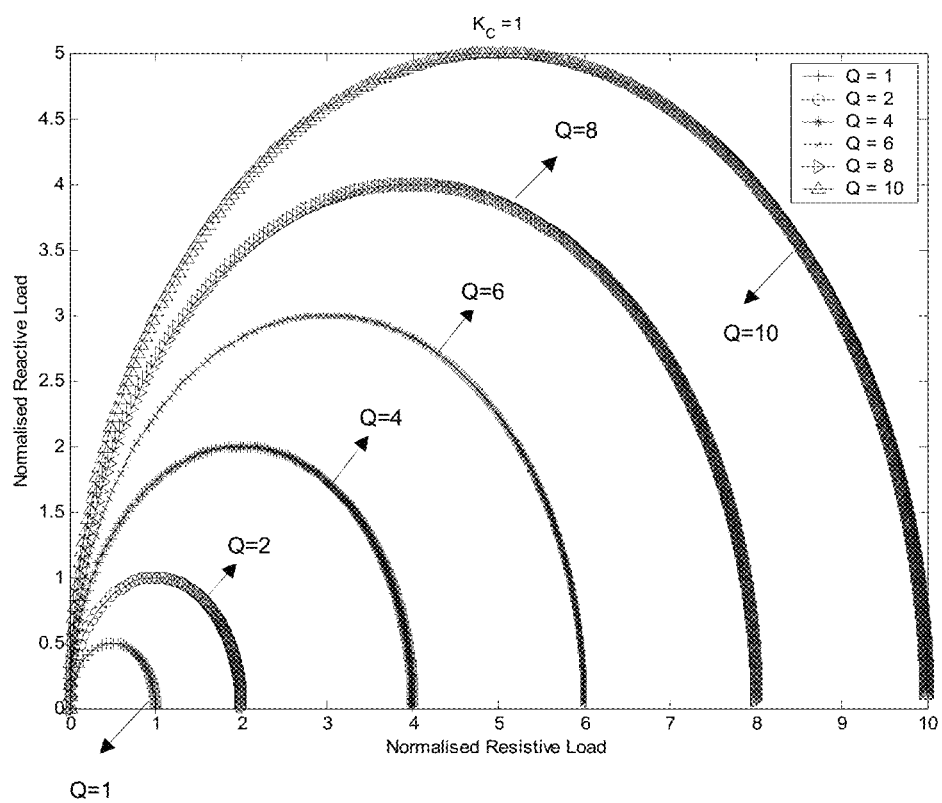
Figure 4D:
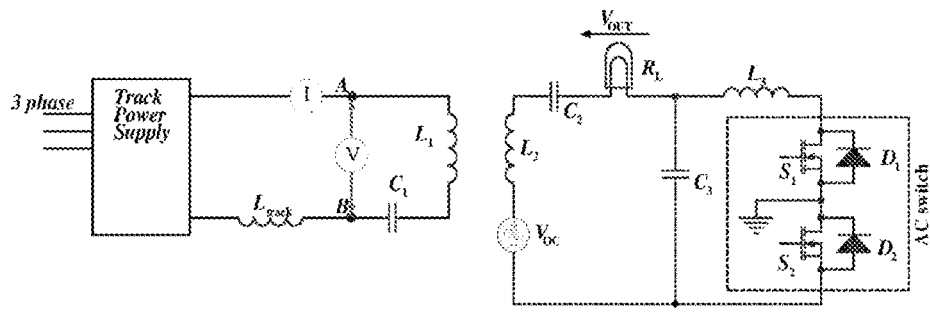

For the modified circuits of FIGS. 3(a) and 4(a), a similar analysis can be undertaken using the simplified circuits shown in FIGS. 3(b) and 4(b), respectively, resulting in similar normalised reflected impedances for each of these circuits as shown in FIGS. 3(c) and 4(c). The results are independent of the values of $K_C$ and $K_L$, where $K_L$ represents the ratio of inductors $L_2$ and $L_3$ in the circuit of FIG. 3 and similarly $K_C$ represents the ratio of capacitors $C_2$ and $C_3$ in the circuit of FIG. 4. As shown, the modified circuits of FIGS. 3 and 4 produce substantially identical reflected VARs which are inductive rather than capacitive.

As can be seen from the impedance curves discussed above and elsewhere in this document, there is a cost in real power drawn from the primary by the compensation device for the benefit provided by the reflected compensatory reactance. To minimise power drawn from the primary conductor by the compensation circuit of the present invention while reflecting the maximum reactance, it is desirable to operate the compensation circuits towards the left-hand side of the charts of FIGS. 1(b), 2(b), 3(c) and 4(c), respectively, where a relatively significant reactive load can be produced with a minimal increase in the resistive load. That is, the compensation circuit is preferably operated in the substantially linear region of the parabolic nominal reactive load vs. nominal resistive load graphs, or the region of the parabola having the greatest slope or gradient. For example, it may be preferred to operate the compensation circuit in the region where the slope is no less than approximately 1 for an inductive reactance and/or no greater than approximately negative 1 for a capacitive reactance. The load created by the compensation circuit should thus be predominantly reactive rather than resistive, so as to vary the reactive load with relatively small changes to the resistive load.

Accordingly, any expected reactance in the primary conductor due to mistuning is preferably largely ameliorated by passive compensation before the IPT system begins operating, as discussed above. This reduces the amount of controlled VARs which the active fast-varying compensation circuit must produce, minimising the power drawn by the compensation circuit due to the resistive load and switching losses. Therefore, in one embodiment the invention includes determining the magnitude or range of magnitude of the power drawn by the compensation device for the magnitude or range of magnitude of the reflected reactance achieved, and designing and/or operating the compensation device to provide an effective reflected reactance for the least power drawn from the primary by the device. In this manner the method involves controlling the compensation device to compensate a reactance in the primary conductive path while drawing minimal power from the primary supply.

As shown by way of example in FIGS. 5(a) and (b), which compare measured and simulated normalised reflective loads, the reflected load can be easily measured in a practical circuit by driving a track with fixed current at its operational frequency. Any section of track having a pick-up circuit of any of FIG. 1(a), 2(a), 3(a) or 4(a) inductively coupled therewith can be tuned out (here using $C_1$) and both the voltage and current and their relative phase angle can be measured across just this section of track. Comparison of this result with that expected for known circuit parameters show excellent agreement in FIG. 5 between the measured values of FIG. 5(a) and the predicted values of FIG. 5(b).

The reactive pick-up circuits of FIGS. 1-4 may be used, in limited circumstances, to control tuning aspects of the overall IPT system. For lighting applications where these circuits are required as the secondary lighting controller, different pick-up circuit topologies may be used in separate pick-ups to achieve a desired result whereby the reflected reactances effectively tune each other out. For example it may be possible to group, in one lighting housing, two half-power lights (e.g. two 500 W lights, rather than a single 1000 W light), the first of which is driven by the circuit of FIG. 1(a) and the second by the circuit of FIG. 3(a). If, in operation, the delay angles of both pick-ups are maintained essentially identical, the two lights can be fully varied from an on state to off state to produce the required light (power) output while the VARs reflected to the track will effectively cancel. That is, the capacitive reactance of the first pick-up circuit will be cancelled by the inductive reactance of the second pick-up circuit. However, the objective of the controller for each such pick-up remains regulating the output power. Furthermore, such an arrangement is not always practical and/or results in unnecessary duplication of components including pick-up coils, capacitors, inductors, switches, and/or diodes.

When operating an IPT system as a whole, the present invention can be used to produce controlled reflected VARs back onto a track in order to remove unwanted VARs seen by the supply. Certain embodiments of the invention provide a fast-acting pick-up controller with a new topology which enables either a capacitive or inductive VAR load to be reflected back onto a track by a single compensation circuit, thereby compensating for inductive or capacitive loads reflected by one or more other pick-up circuits also inductively coupled with the power supply. The level of VARs created by the compensation circuit can be adjusted by adjusting either the delay angle $\phi$ of the controller or the quality factor Q of the circuit. As the VARs created necessarily increase rapidly with Q for a given delay angle, and larger delay angles require more power to be drawn from the track, a controller according to the present invention is preferably designed to operate with a suitably large Q (typically less than 10, but any suitable Q value may be used without departing from the scope of the invention) requiring only limited delay angles, thereby reducing the normalized power drawn. As an example, for a Q of 10, three-four times the VARs can be created compared with the power drawn, providing the delay angles are small.

Two possible compensation circuit topologies will be described below by way of example so that the concept of the invention can be clearly understood. Those skilled in the art will appreciate that different component arrangements may alternatively be used without departing from the scope of the invention.

Parallel-Tuned IPT Pick-Up

A first example of a fast-acting IPT compensation circuit according to the present invention is shown in FIG. 6.

The compensation circuit comprises a pick-up coil or inductor $L_2$ which, in use, is loosely coupled to an IPT primary conductor such as a track (not shown) operating at a frequency in the VLF to LF range (typically 10-140 kHz for medium to high power applications). Tuning capacitor $C_2$ is provided in parallel with the pick-up inductance, forming a resonant circuit therewith. Additional series reactive elements comprising capacitor $C_3$ and $L_3$ are together provided in parallel with pick-up inductor $L_2$ and tuning capacitor $C_2$, forming a second resonant circuit tuned to resonate at the track frequency.

The pick-up inductor $L_2$ is tuned to resonate at the track frequency by the parallel tuning capacitor $C_2$ and inductor $L_3$ as described below, so that when $L_2$ is resonant power is transferred from the primary conductor to the compensation circuit.

To supply a DC output to a load, the compensation circuit preferably also includes a rectifier in parallel with the tuning capacitor $C_2$, along with an output filter comprising inductor $L_{DC}$ and capacitor $C_{DC}$.

A first switching means or AC switch, in the illustrated embodiment comprising MOSFET switches $S_1$ and $S_2$ and diodes $D_1$ and $D_2$ arranged as shown, is provided in parallel with the pick-up inductor $L_2$ and tuning capacitor $C_2$.

During power transfer from the primary conductor to the pick-up coil and a load coupled therewith, the first AC switch is maintained in an open circuit (i.e. non-conductive) state. However, the first AC switch may be operated to selectively disrupt the action of the circuit such that the phase angle $\phi$ is forced to a different value to that which would naturally occur, as described in further detail by WO 2010/030195. As shown in FIG. 1(b), as the phase angle is changed the power delivered can be increased from zero (when the switch is fully on) to a maximum when the switch is fully off. In conjunction with this the reactive load placed on the primary circuit initially is capacitive, and this capacitive reactance increases to a maximum at the half power point, and then reduces as the switch becomes fully open. During this action the second switching means or AC switch, described below, must be kept under short circuit.

Additional series reactive elements comprising capacitor $C_3$ and $L_3$ are together provided in parallel with pick-up inductor $L_2$, tuning capacitor $C_2$, and the first AC switch. A second switching means or AC switch, in the illustrated embodiment comprising MOSFET switches $S_3$ and $S_4$ and diodes $D_3$ and $D_4$ arranged as shown, is provided in parallel with the additional capacitor $C_3$ to selectively shunt or decouple the capacitor. During power transfer from the primary conductor to the pick-up coil and a load coupled therewith, the second AC switch is maintained in a short circuit (i.e. conductive) state, shunting the additional capacitor $C_3$.

If the first AC switch is left open circuit, and the second AC switch is also open circuit, then $L_3$ and $C_3$ will resonate and form a short circuit across the pick-up inductor $L_2$. If this effective short circuit occurs, the power delivered to the load will also be zero as shown in FIG. 3(c). If the tuning capacitor $C_2$ in FIG. 6 is chosen such that it resonates with the combined parallel impedance of $L_2$ and $L_3$ at the track frequency it can be observed that, if the first AC switch is open circuit and the second AC switch is short circuited, the combined reactance of $L_3$, $C_3$ and the AC switch, as seen by the parallel resonant tank (pick-up inductor $L_2$ and tuning capacitor $C_2$), will simply be $X_{L3}$ (i.e. the reactance of $L_3$). Thus, the power delivered to the load will be at maximum because the combined parallel impedance of $C_2$, $L_2$ and $L_3$ is resonant at the track frequency. Therefore, provided the first AC switch is open, then when the second AC switch is in an operable (i.e. short circuit) state, power is supplied to the load, and when the second AC switch is in an inoperable (i.e. open circuit) state, no power is transferred from the primary conductor, so power is not supplied to the load, or at least the supply of power to the load (i.e. the output) is substantially reduced or prevented.

The second AC switch may thus be selectively operated to disrupt the action of the circuit using the method of clamping the resonant current during each half cycle, as described in International Patent Publication No. WO 2012/030238, to change the effective reactance of capacitor $C_3$ as shown in FIG. 3(b). This action changes the impedance of the adjacent inductor-capacitor pair ($L_3$ and $C_3$) and results in a variation in both the power transferred and also the VAR load reflected back onto the primary as shown in FIG. 3(c).

With both the first and second AC switches open, there is no power transfer and the reflected VAR load is capacitive (at a normalised value of −1). As the second AC switch is closed for an increasing amount of time during the resonant cycle, both the power transfer and the VAR load are shown to increase. Provided the Q of the compensation circuit is sufficient (preferably above 2), this VAR load becomes inductive (as shown), and then eventually reduces back to −1 as the second switch becomes fully closed during the full resonant cycle.

When using the compensation circuit of FIG. 6, it may be preferable to deliberately bias the tuning of the primary conductor to have a capacitive reactance by default, whereby the second AC switch of the compensation circuit is predominantly or exclusively operated in preference to the first AC switch, to minimise harmonics.

Series-Tuned IPT Pick-Up

A second example of an IPT compensation circuit according to the present invention is shown in FIG. 7, combining aspects of the series-tuned circuits of FIGS. 2(a) and 4(a).

The compensation circuit comprises a pick-up coil or inductor $L_2$ which when shunted by capacitor $C_{L2P}$ forms an effective inductance $L_2'$ which is slightly smaller (e.g. $L_2'=0.9L_2$) at the frequency of operation of the track to which the pick-up is coupled. This equivalent inductance is tuned to resonate at the track frequency by the tuning capacitor $C_2$, provided in series with the effective pick-up inductor $L_2'$ (and forming a resonant circuit therewith), and additional capacitor $C_3$ as described further below, so that when $L_2'$ is resonant, power is transferred from the primary conductor to the compensation circuit.

To supply a DC output to a load, the compensation circuit preferably also includes a rectifier and filter capacitor $C_{DC}$. Because this is a series tuned system the DC inductor is not required.

A first AC switch, comprising switches $S_1$ and $S_2$ and diodes $D_1$ and $D_2$, is provided in series between tuning capacitor $C_2$ and an output rectifier. These switches are operated to vary the phase between the pick-up coil open circuit voltage and pick-up coil inductor current by substantially preventing current flow in the resonant circuit for a selected time period, as described in further detail by WO 2011/046453.

Additional parallel reactive elements comprising capacitor $C_3$ and equivalent inductor $L_3'$ (comprising the parallel combination of $L_3$ and $C_{L3P}$) are together provided in series between the output rectifier and pick-up inductor $L_2$, forming a second resonant circuit. A second AC switch, comprising switches $S_3$ and $S_4$ and diodes $D_3$ and $D_4$, is provided in series with equivalent inductor $L_3'$, such that the second AC switch is operable to decouple the additional inductor $L_3$. That is, the series inductor $L_3$ and second AC switch are together provided in parallel with additional capacitor $C_3$.

Capacitors $C_{L2P}$ and $C_{L3P}$ are used as effective snubber capacitors to provide a path for the current whenever the first or second AC switches are open.

Suppose that effective inductor $L_3'$ is chosen to resonate with $C_3$ at the track frequency.

When both the first and second AC switches are on (i.e. closed or conducting), the capacitor $C_3$ and inductor $L_3'$ form a parallel resonant circuit at the track frequency, together appearing as an open circuit to the rest of the circuit and thereby reducing the power delivered to the load to zero. Now suppose that capacitor $C_2$ is chosen such that it resonates at the track frequency when in series with capacitor $C_3$ and effective pick-up inductor $L_2'$. When the first AC switch is on and the second AC switch is off (i.e. open or non-conducting), the effective inductor $L_3'$ will be decoupled from the rest of the circuit, and because $C_2$, $C_3$ and the effective pick-up inductor $L_2'$ are resonant at the track frequency, the power delivered to the load is at a maximum.

Therefore, in this embodiment, when the first AC switch is closed and the second AC switch is in an inoperable (i.e. open) state, power is supplied to the load. When either the first AC switch is open or the second AC switch is in an operable (i.e. closed) state, no power is transferred from the primary conductor, so power is not supplied to the load, or at least the supply of power to the load (i.e. the output) is substantially reduced or prevented.

In order to operate the series-tuned IPT pick-up of FIG. 7 as a suitable VAR controller, it is to desirable to operate either AC switch close to the zero power transfer condition where the ratio of VARs generated to real power is a maximum as shown in FIG. 2(b) and FIG. 4(c).

If the first AC switch is closed and the second AC switch is also initially closed, then no power is drawn from the track and VARs are reflected back on to the track as explained above. If the second AC switch is made to open for an increasing period of time over each half cycle of the resonant waveform (as described in further detail in International Patent Publication No. WO 2012/030238) then the VAR loading seen on the primary track due to this operation will be inductive and significantly larger than the power drawn (as shown in FIG. 4(c)), provided the period of time the second AC switch is opened is small.

If the second AC switch is open and the first AC switch is initially open, no power or VARs are created as explained above. If the first AC switch is closed for an increasing period of time over each half cycle of the resonant waveform then, as described by WO 2011/046453 and shown in FIG. 2(b), the VAR loading on the track will be increasingly capacitive and significantly greater than the power drawn providing the period of time the first AC switch is closed is small.

The compensation circuit of FIG. 6 will generally be preferred over that of FIG. 7, as the current in the inductor is not broken and minimal protection is required.

Other Embodiments

In other embodiments of the invention, the pick-up circuit may comprise only a single controllable reactive element (i.e. a single AC switch acting to selectively short a capacitor or inductor) as shown in FIG. 1(a), 2(a), 3(a) or 4(a), for example, where it is expected that the fast-acting compensation circuit will be required to compensate only one of a capacitive or inductive reactance in the primary conductor, for example the primary may be provided with, or otherwise have, an inductive or capacitive bias as discussed earlier in this document. The compensation circuits thus differ from the pick-up circuits of the prior art in that they comprise controllers adapted to sense the reactance in the primary conductor and control the reactive element to generate a commensurate reactive load to ameliorate the reactance in the primary conductor, rather than merely regulating the output power of the pick-up to supply a load coupled therewith.

Where a compensation circuit having a single controllable reactive element is possible, the parallel-tuned circuits of FIGS. 1(a) and 3(a) will generally be preferred, as they do not break the inductor current under control action. More particularly, the circuit of FIG. 3(a) may be preferred as it exhibits a lower total harmonic distortion (THD).

Parallel-Tuned IPT Pick-Up with Single Controllable Reactive Element

In yet another embodiment, the circuit of FIG. 3(a) can in fact be controlled to selectively reflect either an inductive or a capacitive reactance to the primary conductor as required, albeit with a smaller VAR control range in either direction. This can be achieved by selecting the components so that the combined action of the additional reactive components $L_3$ and $C_3$ (which is varied by the AC switch) varies across a different range.

More particularly, if the additional inductor $L_3$ is smaller or $C_3$ larger than otherwise desired, when the AC switch is off the resonant circuit formed by the additional inductor and capacitor is not tuned at the operating frequency and the pick-up inductor $L_3$ is not short circuited. The AC switch can thus be used to control the capacitor $C_3$ to pass through an operating point at the middle of the desired control range where the effective $C_3$ resonates with $L_3$ at the operating frequency, shorting the pick-up inductor $L_2$. By adjusting the action of the AC switch, the effective value of $C_3$ can be moved in either direction to reflect either an inductive or capacitive reactance to the primary conductor. For example, the components are preferably selected, and the AC switch controlled, to give rise to an effective capacitance ranging from zero to twice the capacitance at which additional capacitor $C_3$ resonates with additional inductor $L_3$ at the operating frequency.

Essentially, this biases the circuit of FIG. 3(a) to be able to sweep both capacitive and inductive ranges, so that the first AC switch of the circuit of FIG. 6 is no longer required.

A chart of the simulated normalised reflected impedance of a circuit according to this embodiment is shown in FIG. 9, showing that the circuit can be used to reflect either an inductive or capacitive reactance as required.

It will be seen that this approach whereby component values of the compensation device circuit may be selected to allow a sweep of both capacitive and inductive ranges is not confined to FIG. 3, but can be implemented with appropriate design or reconfiguration of the other circuits disclosed herein for example FIGS. 1, 2, and 4.

Control

From the foregoing it will be apparent that the circuit of the present invention preferably comprises some form of controller or control means to automatically operate the first and/or second AC switches. Operation of the first and second AC switches is preferably based upon feedback which may comprise, for example, power drawn from a mains supply, current in the primary conductor, and/or current in the inverter bridge of the power supply. The compensation circuit, or more specifically the control means, thus preferably comprises a sensor or sensing means for obtaining the feedback required for the control strategy, and in particular sensing the reactance in the primary conductor. Alternatively, the primary side of the IPT system, or more specifically the power supply, may comprise a sensor for sensing the reactive load, and communicating this feedback to the compensation circuit. The controller preferably allows some hysteresis to avoid unnecessarily switching between operation of the first and second AC switches, for example.

The design and implementation of a suitable control means performing the methods described herein is within the capabilities of a person skilled in the field of control systems engineering, and is therefore not described in detail herein. For example, the control means may be adapted to sense a phase angle between a voltage and current in the primary conductor, and operate the first and second AC switches to eliminate or at least ameliorate that phase angle and resultant reactive power.

The control means may be implemented as a purely hardware-based controller consisting of one or more components which may include discrete electronic components or integrated circuits including operational amplifiers and logic devices. Alternatively, or additionally, the control means may be implemented at least in part as a software-based controller using reconfigurable or programmable hardware components such as a programmable logic device (PLD) or field programmable gate arrays (FPGA), or a processor which may comprise a microcontroller or general purpose personal computer (PC) executing software programmed to control the first and second switches and perform the methods described herein.

Preferably, however, the invention would be implemented as an embedded system using a combination of the aforementioned components.

System Design

The actual magnitude of the VARs and power drawn for the circuits of FIGS. 6 and 7 is dependent on and increases with the Q of the secondary circuit.

The operating Q of the circuit can be defined at system design. Because the circuit of FIG. 6 is a parallel-tuned VAR controller, the actions of the switches do not break inductor current during operation and it is therefore easier to operate and scale to high power in practical operation. In consequence it is easier to construct and preferable for high power applications.

As an example, for the circuit of FIG. 6, the ratio of the tuned AC voltage (at the input to the rectifier) and the open circuit voltage coupled from the primary defines the maximum operating Q.

An IPT system, including the compensation circuit of either of FIG. 6 or 7 (or other circuits discussed herein) coupled to an IPT power supply, is shown by way of example in FIG. 8. One or more pick-up circuits supplying loads (such as a lighting apparatus or an electric vehicle, represented by load $Z_L$) may be inductively coupled with the primary track inductor $L_1$ in use. The compensation circuit will compensate for unwanted VARs reflected by those pick-up circuits, as described above. Operation of the compensation circuit is controlled based upon feedback from the power supply which may be communicated from sensing means in the power supply wirelessly (by way of radio frequency communications, for example) or by a wired connection (since the compensation circuit may be integrated with, or provided substantially adjacent to, the power supply).

The output of the compensation circuit rectifier can be electrically coupled to the DC bus of the inverter supplying the primary track at points A and B. If the DC capacitor at the output of the mains rectifier is large, this DC bus voltage is nominally constant, and consequently fixes the maximum tuned AC voltage at the input to the rectifier in FIG. 6. As such the maximum operating Q of the circuit is also fixed. During operation the power drawn by the VAR controller from the track will therefore naturally flow into the DC bus capacitor of the supply but the inverter bridge losses will increase slightly due to the additional power demanded. In consequence, the AC switches in VAR controller should only operate between 0-10% or 0-5% of their full control range (depending on the resolution of the control available) to enable between three-four times the VARs to be generated at the expense of this additional loss.

Alternatively, or additionally, power output from the compensation circuit may be used to supply a load electrically coupled therewith.

Applications

Applications of the compensation circuits of the present invention may include, but are not limited to, EV systems where the primary track inductance may appear to change due to a series-tuned secondary system (i.e. the pick-up in the electric vehicle) being used, when the primary power supply and conductor are designed for a parallel-tuned secondary system (or vice versa). In that case, given knowledge of the secondary system via communications (as may be required by EV charging standards, for example) or other means, 'coarse' compensation may first be activated by switching a capacitor in series with the primary conductor or adjusting the frequency of the power supply to roughly compensate the primary before operation.

Other example applications may include material handling systems (with multiple secondary coupled systems) where the collective loads act to appear similar to a single large VAR variation on the track, low power charging systems for consumer devices such as mobile cellular telephones or laptop computers, or lighting applications where the secondary action creates detuning VARS.

From the foregoing it will be seen that a compensation circuit, IPT power supply, IPT system, and/or VAR control method are provided which enables a capacitive and/or inductive reactance to be selectively reflected to a primary conductor to compensate for variable inductive or capacitive reactances (or VAR), respectively, in the system. As a result, mistuning of the AC current in the primary conductor is minimised and component rating requirements may be reduced.

Unless the context clearly requires otherwise, throughout the description, the words "comprise", "comprising", and the like, are to be construed in an inclusive sense as opposed to an exclusive or exhaustive sense, that is to say, in the sense of "including, but not limited to".

Although this invention has been described by way of example and with reference to possible embodiments thereof, it is to be understood that modifications or improvements may be made thereto without departing from the scope of the invention. The invention may also be said broadly to consist in the parts, elements and features referred to or indicated in the specification of the application, individually or collectively, in any or all combinations of two or more of said parts, elements or features. Furthermore, where reference has been made to specific components or integers of the invention having known equivalents, then such equivalents are herein incorporated as if individually set forth.

Any discussion of the prior art throughout the specification should in no way be considered as an admission that such prior art is widely known or forms part of common general knowledge in the field.

The invention claimed is:

1. A method for controlling reactance in the primary conductor of an inductive power transfer (IPT) system, the method comprising:
   sensing a variable reactance in the primary conductor;
   switching a first reactive element associated with a resonant circuit inductively coupled with the primary conductor in to the resonant circuit for a first non-zero time period during a first half cycle of a resonant cycle of the resonant circuit; and
   switching the first reactive element out of the resonant circuit for a second non-zero time period during the first half cycle of the resonant cycle of the resonant circuit,
   wherein the first non-zero time period and the second non-zero time period are different time periods, and wherein the first reactive element is switched dependent on the sensed reactance to reflect a controlled compensatory reactance which ameliorates the variable reactance in the primary conductor.

2. The method of claim 1 further comprising switching the first reactive element in order to provide a phase delay in the resonant circuit.

3. The method of claim 2 further comprising changing the phase delay to change the controlled compensatory reactance from inductive to capacitive, or from capacitive to inductive.

4. The method of claim 2, wherein the method comprises clamping the resonant current for a portion of the cycle to introduce a phase angle between the voltage induced in the resonant circuit, via the inductive coupling with the primary conductor, and the resonant current.

5. The method of claim 4, wherein the method comprises varying the portion of the cycle that the resonant current is clamped to control the compensatory reactance that the resonant circuit reflects.

6. The method of claim 4, wherein the method comprises unclamping the resonant current for another, non-concurrent, portion of the cycle of the resonant circuit so that each half cycle of the resonant cycle comprises a first portion where the resonant current is clamped, and a second portion where the resonant current is not clamped.

7. The method of claim 1, wherein the method comprises shorting the first reactive element for a first duration in a first resonant cycle of the resonant circuit, and shorting the first reactive element for a second duration in a second resonant cycle of the resonant circuit without interrupting the resonant current, wherein the first resonant cycle and the second resonant cycle are consecutive resonant cycles of the resonant circuit, and the second duration is greater than the first duration.

8. A method comprising:
   measuring a time variable reactance in a primary conductor of an inductive power transfer system,
   reflecting, from a resonant compensatory device that is loosely coupled with the primary conductor, a time variable compensatory reactance to compensate the measured time variable reactance in the primary conductor,
   modulating a time, during consecutive resonant cycles of the resonant compensatory device, that a reactive element associated with a tuned pick-up coil of the compensatory device is switched into a circuit with the pick-up coil of the compensatory device, dependent on the sensed reactance, to generate the compensatory reactance, and
   clamping the voltage across the reactive element associated with the tuned pick-up coil during a portion of the half cycle of the resonant circuit, and unclamping the voltage across the reactive element associated with the tuned pick-up coil during the remainder of the half cycle of the resonant circuit.

9. The method of claim 8, wherein the method comprises controlling the tuning of the resonant compensation device, dependant on the measured time variable reactance in the primary conductor, to retune the primary conductor of the inductive power transfer system.

10. The method of claim 8, wherein the method comprises short-circuiting the reactive element associated with the resonant circuit of the compensation device to introduce a phase delay in the resonant circuit.

11. A method of operating a resonant wireless power transfer system comprising:
   switching a power supply of the resonant wireless power transfer system at a first frequency to make power available for wireless power transfer from a primary conductor of the resonant wireless power transfer system, wherein the primary conductor is tuned, for an expected load state, to resonate at the first frequency by a first compensation circuit;

transferring power wirelessly from the primary conductor to at least one secondary wireless power transfer device that is loosely coupled with the primary conductor, wherein the at least one secondary wireless power transfer device reflects a VAR load onto the primary conductor that causes the resonant wireless power transfer system to operate with a reactive load that is outside to the expected load state;

measuring a variable reactance in the primary conductor, caused by the VAR load reflected onto the primary conductor by the at least one secondary wireless power transfer device, while the power supply is switched at the first frequency;

compensating the variable reactance in the primary conductor, caused by the VAR load reflected onto the primary conductor by the at least one secondary wireless power transfer device, with a second compensation circuit that reflects a compensatory reactance onto the primary conductor, wherein the second compensation circuit is part of a compensation device that is loosely coupled with the primary conductor; and modulating, with the compensation device, a period of time, during a resonant cycle of the second compensation circuit, that the second compensation circuit is switched to disrupt the action of the second compensation circuit by clamping the resonant current of the second compensation circuit.

12. The method of claim 11, wherein the compensation device switches the second compensation circuit at the first frequency, and the compensation device varies the switching duration, of the second compensation circuit, to create a variable compensatory reactance that is commensurate with the variable reactance in the primary conductor.

13. The method of claim 11, wherein the compensation device clamps a reactive element in the second compensation circuit at zero volts for a first period during a half cycle of the resonant cycle, and the compensation device does not clamp the reactive element at zero volts for the remainder of the half cycle of the resonant cycle.

14. The method of claim 13, wherein the compensation device varies the first period responsive to the magnitude of the variable reactance in the primary conductor.

15. The method of claim 11, wherein the method comprises switching one or more capacitors into, or out of, the first compensation circuit to tune the primary conductor to the first frequency at the expected load state before operating the power supply.

16. A method comprising:

making power available, for wireless power transfer, from a resonant wireless power transfer primary, wherein the resonant wireless power transfer primary makes the power available at a first frequency;

transferring power wirelessly, from the resonant wireless power transfer primary, to at least one resonant wireless power transfer secondary, wherein the at least one resonant wireless power transfer secondary reflects a reactive load onto the resonant wireless power transfer primary that detunes the resonant wireless power transfer primary from the first frequency;

sensing a variable reactance, caused by the reactive load reflected by the at least one resonant wireless power transfer secondary, in the resonant wireless power transfer primary;

reflecting a VAR load, from a resonant compensation device that is loosely coupled with the resonant wireless power transfer primary, to adaptively retune the resonant wireless power transfer primary to the first frequency; and varying the effective reactance of a reactive element in the resonant compensation device in consecutive resonant cycles to produce the reflected VAR load responsive to the sensed variable reactance by:

switching the first reactive element in to the resonant circuit for a first non-zero time period during a first half cycle of the resonant cycle, and switching the first reactive element out of the resonant circuit for a second non-zero time period during the first half cycle of the resonant cycle of the resonant circuit, wherein the first non-zero time period and the second non-zero time period are different time periods.

17. The method of claim 16, wherein the method comprises varying, in consecutive resonant cycles of the resonant compensation device, a phase angle between a voltage induced in a pick-up coil of the compensation device and a current through the pick-up coil of the resonant compensation device.

18. The method of claim 17, wherein the method comprises shorting a tuning capacitor, connected in parallel with the pick-up coil of the resonant compensation device, to introduce a phase delay in the resonant compensation device that is dependent on the variable reactance sensed in the resonant wireless power transfer primary.

19. The method of claim 16, wherein the method comprises shorting a pick-up coil of the resonant compensation device, at the first frequency, with a capacitor and an inductor that are (i) connected in series with each other, (ii) connected in parallel with the pick-up coil, and (iii) tuned to resonate at the first frequency.

20. The method of claim 16, wherein the method comprises tuning the resonant wireless power transfer primary for expected VAR loads, before making power available for wireless power transfer, with a passive compensation circuit comprising one or more switched capacitors, and adaptively tuning the resonant wireless power transfer primary for unexpected VAR loads, concurrently with making power available for wireless power transfer, with the resonant compensation device that is loosely coupled with the resonant wireless power transfer primary.

* * * * *